US012589691B2

(12) United States Patent
Lendle et al.

(10) Patent No.: US 12,589,691 B2
(45) Date of Patent: Mar. 31, 2026

(54) MOTOR VEHICLE AND METHOD FOR OPERATING A MOTOR VEHICLE

(71) Applicant: AUDI AG, Ingolstadt (DE)

(72) Inventors: Reiner Lendle, Hassmersheim (DE); Stefan Reich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 18/261,627

(22) PCT Filed: Dec. 13, 2021

(86) PCT No.: PCT/EP2021/085357
§ 371 (c)(1),
(2) Date: Jul. 14, 2023

(87) PCT Pub. No.: WO2022/156960
PCT Pub. Date: Jul. 28, 2022

(65) Prior Publication Data
US 2024/0083350 A1     Mar. 14, 2024

(30) Foreign Application Priority Data

Jan. 19, 2021     (DE) ..................... 10 2021 100 982.0

(51) Int. Cl.
*B60Q 1/50*          (2006.01)
*B60Q 1/32*          (2006.01)
*B60Q 1/34*          (2006.01)

(52) U.S. Cl.
CPC ........... *B60Q 1/5037* (2022.05); *B60Q 1/324* (2022.05); *B60Q 1/346* (2013.01); *B60Q 1/525* (2013.01)

(58) Field of Classification Search
CPC ...... B60Q 1/5037; B60Q 1/324; B60Q 1/346; B60Q 1/525; B60Q 2900/50; B60Q 1/26;
(Continued)

(56) References Cited

U.S. PATENT DOCUMENTS 5,877,682 A     3/1999  Groeller
10,670,859 B2 *  6/2020  Logiudice .............. H05B 45/10
(Continued)

FOREIGN PATENT DOCUMENTS

CN     101456378 A     6/2009
DE     3315785 A1     11/1984
(Continued)

OTHER PUBLICATIONS

International Search Report and Written Opinion directed to related International Application No. PCT/EP2021/085357, mailed on Apr. 12, 2022, with attached English-language translation; 18 pages.
(Continued)

*Primary Examiner* — Daryl C Pope
(74) *Attorney, Agent, or Firm* — Sterne, Kessler, Goldstein & Fox P.L.L.C.

(57)     ABSTRACT

The present disclosure relates to a motor vehicle having a control device and at least one lighting device, which comprises several light-emitting diodes arranged to be distributed within at least one surface, wherein at least one signal light can be generated by means of the lighting device. The control device is designed to individually control the light-emitting diodes and/or several groups of the light-emitting diodes such that a contour of the signal light is dependent upon at least one item of operational information. The at least one item of operational information is at least one item of driver assistance information which describes a current operating situation and/or a current vehicle environment situation of the motor vehicle and which can be generated by means of a driver assistance system of the motor vehicle, and/or at least one item of user action information which can be generated by means of at least one operating device of the motor vehicle by a user.

22 Claims, 6 Drawing Sheets

(58) Field of Classification Search
    CPC ... B60Q 2400/30; B60Q 2400/40; B60Q 1/52
    See application file for complete search history.

(56)                    References Cited

U.S. PATENT DOCUMENTS

| | | | | |
|---|---|---|---|---|
| 10,960,815 | B2 | 3/2021 | Li et al. | |
| 11,820,282 | B2 * | 11/2023 | Mimura ................... | B60Q 1/30 |
| 2008/0122606 | A1 * | 5/2008 | Bradley .............. | B60Q 1/0017 |
| | | | | 340/468 |
| 2017/0332458 | A1 | 11/2017 | Salter et al. | |
| 2018/0319327 | A1 * | 11/2018 | Cunningham, III ... | G08G 1/168 |

FOREIGN PATENT DOCUMENTS

| | | | |
|---|---|---|---|
| DE | 3315785 | C2 | 9/1988 |
| DE | 10130259 | A1 | 1/2003 |
| DE | 102011076330 | A1 | 11/2012 |
| DE | 102012004759 | A1 | 9/2013 |
| DE | 102017216934 | A1 | 3/2019 |
| EP | 3093192 | A1 | 11/2016 |
| EP | 3653439 | A1 | 5/2020 |
| EP | 3718827 | A1 | 10/2020 |
| FR | 3049528 | A1 | 10/2017 |

OTHER PUBLICATIONS

International Preliminary Report on Patentability directed to related International Application No. PCT/EP2021/085357, mailed on May 9, 2023, with attached English-language translation; 17 pages.

* cited by examiner

MOTOR VEHICLE AND METHOD FOR OPERATING A MOTOR VEHICLE

TECHNICAL FIELD

The present disclosure relates to a motor vehicle having a control device and at least one lighting device, which comprises several light-emitting diodes arranged to be distributed within at least one surface, wherein at least one signal light can be generated by means of the lighting device. Furthermore, the present disclosure relates to a method for operating a motor vehicle having a control device and at least one lighting device, which comprises several light-emitting diodes arranged to be distributed within at least one surface, wherein at least one signal light is generated by means of the lighting device.

BACKGROUND

It is known from the prior art that, aside from the purpose of illuminating an environment of the motor vehicle, lighting devices in motor vehicles are also used as means for transmitting information. An example of this is, for example, a flashing device, by means of which the driver can signal an intended turn or a lane change with regard to further road users. A further example is a brake light, by means of which a braking of the motor vehicle is implied for further road users.

For example, DE 33 15 785 C2 discloses a motor vehicle light with matrix-like light-emitting diodes arranged on a base plate, by means of which different light colors can be produced. The overall arrangement of the light-emitting diodes is divided into several regions. For example, a circular region for generating a yellow flashing light can be switchable separately, wherein the remaining region is used to generate a red reversing light.

A flashing light of a motor vehicle is known from DE 101 30 259 A1. The flashing light is divided in a row-like and column-like manner, wherein a movement direction indicator is realized by successive toggling of the rows or columns. For example, the flashing with horizontal partial regions is provided to realize a hazard light or to indicate a deceleration or an acceleration of the motor vehicle—in particular, on the basis of the speed.

DE 10 2011 076 330 A1 discloses vehicle external lighting with a light generating unit comprising a screen for generating a signaling function. The signaling function relates in particular to the display of a direction of travel, a brake light, a rear fog light, a taillight, and/or a position light. In this case, corresponding light emission patterns can differ with regard to their shape, position, brightness, color, and/or temporal variation.

BRIEF DESCRIPTION OF DRAWINGS/FIGURES

DETAILED DESCRIPTION

Figure 1:
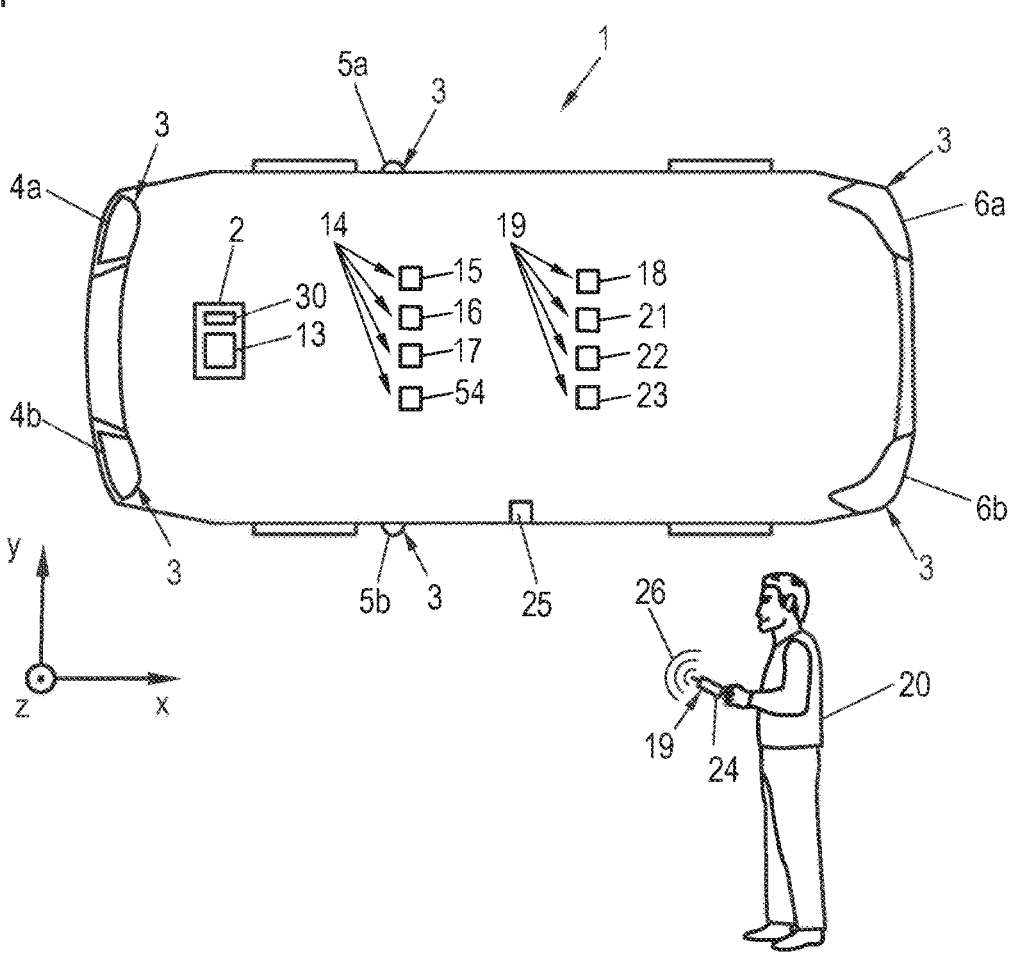
FIG. 1 shows a first exemplary embodiment of a motor vehicle according to the present disclosure.

The object of the present disclosure is that of providing an improved concept with regard to a motor vehicle having a lighting device—in particular, with regard to a design, which is technically as simple as possible, and information which can be transmitted across the widest possible spectrum.

According to the present disclosure, this object is achieved in a motor vehicle of the initially-mentioned type in that the control device is designed to individually control the light-emitting diodes and/or several groups of the light-emitting diodes individually such that a contour of the signal light is dependent upon at least one item of operational information, wherein the at least one item of operational information is at least one item of driver assistance information which describes a current operating situation and/or a current vehicle environment situation of the motor vehicle and which can be generated by means of a driver assistance system of the motor vehicle, and/or at least one item of user action information, which can be generated by means of at least one control device of the motor vehicle by a user.

The present disclosure is based upon the idea that the contour of the signal light, i.e., the shape or the outline of the lighting surface of the lighting device forming the signal light, is used as an information carrier, by means of which the information is transmitted to further road users. In this case, the information on the part of the further road users can be detected intuitively, since, by means of corresponding contours, certain associations can be awakened automatically or subconsciously and directly relate to the information to be transmitted.

For example, in the prior art, information is transmitted by means of the lighting device on the basis of the mere illumination or the—in particular, wiper-like—flashing of the signal light. In this case, the transmission of information on the basis of a flashing light frequency of the signal light is basically conceivable, but the bandwidth of transmissible information can be significantly limited, e.g., due to legal limitations with regard to the possible flashing frequencies, and is therefore barely usable for information transmission. In contrast, the number of items of transmissible information based upon different contours of the signal light is significantly higher and can also be detected more easily by possible recipients of the information.

The advantages of the present disclosure become particularly apparent from an example in which the lighting device is used as part of a flashing function and/or a hazard light function. In this case, the signal light is switched on and off, and in particular periodically. In this context, it is provided, for example, that the or a further control device be designed to control the light-emitting diodes and/or several groups of the light-emitting diodes such that the flashing function and/or the hazard light function is also realized. For example, in the case of a parked motor vehicle, it is frequently not apparent to further road users whether the flashing of this motor vehicle is connected to a current unlocking or locking of the motor vehicle, whether a hazard light system is currently switched on, or whether the flashing light indicates an imminent exit from the parking space. The side of the motor vehicle facing away from the roadway is frequently covered from view of the further road users by a parked vehicle. In the motor vehicle according to the present disclosure, a clear distinction between these different functions of the lighting device is also possible in said situations due to the respective contour of the signal light, wherein corresponding details will be described further below.

In the motor vehicle according to the present disclosure, it is provided that several light sources—in the present case, light-emitting diodes—of the lighting device be arranged to be distributed within at least one surface. The light-emitting diodes are therefore positioned next to one another such that different contours of the signal light can be generated from the point of view of further road users by means of an individual illumination of the light-emitting diodes. The contour or the signal light is visible to the outside, and in particular through a transparent pane of the lighting device. The control device can be designed to control each light-emitting diode individually or to control the light-emitting diodes independently of one another. The light-emitting diodes can also form several groups which are each individually controllable by the control device. A corresponding group can comprise several directly adjacent light-emitting diodes—for example, four adjacent light-emitting diodes arranged in a square to one another. From a technical point of view, the generation of different contours in the motor vehicle according to the present disclosure—in particular, in comparison to monitor-based concepts—is very simple.

The light-emitting diodes can be fastened, and in particular soldered, on a light-emitting diode carrier of the lighting device. The light-emitting diode carrier therefore has a support surface for the light-emitting diodes, which support surface can be flat or curved or arched. The light-emitting diode carrier can be of a single-piece or a multipiece design, wherein, in the second case, several light-emitting diode carrier parts can be fastened—in particular, laterally—to one another or distributed over several planes. In order to avoid any covering of light-emitting diodes by light-emitting diode carrier portions, the light-emitting diode carriers can be transparent with respect to the light emitted by the light-emitting diodes.

The contour of the signal light depends upon at least one item of operational information which is potentially relevant for other road users and which can in principle also be output to the user—in particular, by means of an output device, provided, for example, as a touchscreen, of the motor vehicle. The operational information can be the driver assistance information which describes the current operational information and/or the current vehicle environment situation of the motor vehicle. The operating situation relates in particular to the driving operation of the motor vehicle—for example, acceleration and/or braking and/or a presence of a malfunction. The vehicle environment situation relates to the surroundings of the motor vehicle—in particular, the road on which the motor vehicle is located, and/or a sidewalk or a bike path adjacent thereto. For example, the vehicle environment situation relates to a detection of an obstacle and/or another road user—in particular, a pedestrian and/or a cyclist and/or another motor vehicle—and/or to a detection of a possible hazardous situation, such as a tail end of a traffic jam and/or a traffic accident and/or a special signal of an emergency vehicle—for example, a blue light or a siren.

The driver assistance information is generated by means of a driver assistance system of the motor vehicle or is present, in other words, in the context of the control of the motor vehicle by means of the driver assistance system. The driver assistance system can be designed to operate the motor vehicle at different autonomy levels. For example, the driver assistance system can be designed only for automatic parking but also allow for fully-automated driving operation of the motor vehicle. The execution or operation of the driver assistance system can be carried out on the control device or on a further control device—in particular, provided for this purpose.

The operational information can additionally or alternatively be the user action information which can be generated by means of the operating device by the user, and in particular a driver of the motor vehicle. The user action information relates to a control command brought about by the user by means of a control action and generated by the operating device, said control command being processed by the control device for generating the light signal. The user action information can explicitly be directed towards a corresponding information output being brought about by means of the signal light. For example, a user-side activation of a hazard light is conceivable in this context, which will be described in detail later. Additionally or alternatively, the user action information can be a control action, which is in any case executed by the user as part of the driving operation of the motor vehicle—for example, the actuation of an operating device designed as a gas or brake pedal. For this purpose, there is a corresponding communications link between the control device and the operating device.

If the at least one item of operational information is the at least one item of driver assistance information, the operational information can be detectable by means of at least one sensor of the motor vehicle. The information detected by means of the sensor is typically used as part of the autonomous operation of the motor vehicle by means of the driver assistance system. In the present case, this information can be used in a synergetic manner in addition to the generation of the signal light or the contour. A corresponding communications link is therefore present between the control device and the sensor.

The at least one sensor can be an optical sensor—in particular, designed as a camera—and/or an acoustic sensor and/or a radar sensor and/or an accident detection sensor—in particular, designed as an acceleration sensor. If the at least one sensor is an optical sensor and/or a radar sensor of the motor vehicle, the detected images can be evaluated in the context of the driver assistance system. For example, other road users, such as pedestrians, cyclists, or further motor vehicles, can be automatically recognized, wherein the corresponding recognition can be output as information by means of the contour of the signal light.

For example, a pedestrian who is about to cross a branching road, into which the motor vehicle intends to turn, can thus see that said pedestrian has been recognized by the driver assistance system, and that a hazard-free crossing of the road is thus possible. Particularly advantageous is a corresponding information output in situations in which a cyclist is located on a bike path on the right next to the motor vehicle and intends to continue straight ahead, while the driver of the motor vehicle intends to turn right. In particular in the case in which the motor vehicle is a truck, severe accidents can be avoided in this context. For example, the cyclist can recognize from the contour of the signal light that said cyclist has been detected by the driver assistance system of the motor vehicle, and a safe continuation is possible for said cyclist.

In addition, an accident situation in which the motor vehicle itself is not involved can be detected by means of the optical sensor. For example, a hazard light and/or a blue light in the surroundings of the motor vehicle can be detected by means of the optical sensor. In addition, the at least one sensor can be an acoustic sensor, by means of which sounds from the surroundings of the motor vehicle can be detected. In this case, a sound of a horn or a siren can be detected—in particular, on the basis of the volume—from which the distance to the corresponding source of the sound can be deduced.

If a further motor vehicle according to the present disclosure is involved in the accident situation in the surroundings of the motor vehicle, a contour of the signal light of the further motor vehicle according to the present disclosure indicating the accident situation can be detected by means of the optical sensor, and the contour of the signal light of the motor vehicle can be generated accordingly.

The at least one sensor can be designed as an accident detection sensor, by means of which a possible accident situation in which the motor vehicle itself is involved can be detected. The accident detection sensor can be an acceleration sensor, by means of which a collision of the motor vehicle can be detected. In this case, the signal light can fulfill the function of a hazard light system, wherein the contour of the signal light indicates the presence of a corresponding accident situation.

If the at least one item of operational information is the at least one item of user action information, the at least one operating device can be a lever—in particular, for initiating the or a flashing function of the lighting device—and/or a button, provided in particular for initiating the or a hazard light function of the lighting device, and/or a touchscreen and/or a speech recognition device and/or a—in particular, radio-based—key for unlocking and locking the motor vehicle.

If the at least one operating device is the lever, by means of which the user can initiate a flashing, the lighting device not only fulfills the function of the turn signal itself, but other road users can be provided with further information by means of the corresponding contour. For example, the contour can indicate the direction of the intended turn or lane change of the motor vehicle. In addition, it is conceivable that, as already explained above, the signal light present as a flashing light indicate the detection of a further road user in the context of a corresponding turn. The lever is typically arranged in the region of a dashboard of the motor vehicle, and in particular adjacent to a steering wheel of the motor vehicle.

If the at least one operating device is the button, by means of which the hazard light function of the lighting device can be activated, the contour of the signal light can indicate to other road users that a corresponding hazardous situation is currently present. The button is typically arranged in the region of the dashboard of the motor vehicle.

If the at least one operating device is a touchscreen or a speech recognition device, in particular the or a flashing function and/or the or a hazard light function of the lighting device can be activated by means of the operating device. Additionally or alternatively, other user commands relating to the signal light can be generated by means of the operating device, which will be described further below.

If the at least one operating device is the key for unlocking and locking the motor vehicle, it is designed to generate a radio signal, which brings about the unlocking or locking of vehicle doors and hatches of the motor vehicle. In this case, the vehicle comprises a radio sensor designed for sensing the radio signal and communicating with the control device. While, in systems from the prior art, a corresponding unlocking or locking of the motor vehicle is indicated, for example, by a brief two-time flashing of the hazard light, corresponding information can be output via the contour of the signal light in the motor vehicle according to the present disclosure.

The light-emitting diodes can be arranged in a row-like and/or column-like manner. Particularly preferably, the light-emitting diodes are arranged with respect to one another in the form of a rectangular—in particular, square—grid (i.e., in the form of a matrix). For generating the contour, the light-emitting diodes can form a type of image, wherein the light-emitting diodes or groups of light-emitting diodes each constitute a pixel of said image. Each pixel or each light-emitting diode or group of light-emitting diodes can preferably assume two states, viz., an illuminated state, in which the assigned light-emitting diode or group is switched on and emits light, and an unilluminated state, in which the assigned light-emitting diode or group is switched off and does not emit light. Furthermore, it is conceivable that the control device be designed to control the light-emitting diodes or groups of light-emitting diodes—in particular, individually—with respect to their brightness. As a result, it can be achieved that the total brightness of the signal light be able to be adjusted—for example, on the basis of sensed parameters. For example, it can be provided for the signal light to become brighter with the increasing volume of a detected sound of a siren. Furthermore, the brightness within the signal light can also differ, or, in other words, a symbol shown by means of the contour can have regions with different brightness regions.

The at least one lighting device can be arranged on a front portion and/or a rear portion and/or a lateral portion of the motor vehicle. The lighting device can therefore be a headlight or a side marker, i.e., a side light or a taillight. In this embodiment, the contour can be seen from different viewing directions. Particularly preferably, the motor vehicle comprises several lighting devices which are arranged at different locations of the motor vehicle such that the signal light is visible from as many viewing directions as possible, and in particular from all viewing directions.

If several lighting devices, which are visible in particular from different viewing angles to the motor vehicle, are arranged at different positions of the motor vehicle, the control device can be designed to control the lighting devices such that the contour of at least two of the several lighting devices is different. Information to be transmitted can thus be output only in specific directions, provided that this makes sense. For example, the detection of a further road user can be output only by the lighting device or the lighting devices which is or are arranged on the side of the motor vehicle facing the further road user. The remaining lighting devices can output other information.

In the motor vehicle according to the present disclosure, the contour can be at least one predefined symbol, which can be retrieved by means of the control device from a data memory of the motor vehicle. In this case, the data memory can be integrated into the control device. Accordingly, different items of operational information can be assigned to different and predefined contours, wherein the respective contours indicate the respective associated items of operational information.

With regard to the predefined contour, it can have a specific styling such that reference is made to a vehicle variant and/or a motorization of the respective motor vehicle. In other words, the contour of the signal light or the corresponding styling can differ according to the model of the motor vehicle. For example, symbols shown by means of the contour, such as arrows or the like, can be displayed in italics in a first model of a motor vehicle manufacturer and displayed in a standard manner in a second model of this manufacturer. As a result, a recognition effect of the respective vehicle type can be realized.

The at least one predefined symbol is preferably a letter and/or a number and/or a pictogram. Such symbols are particularly well suited for intuitively and easily alerting other road users to corresponding operational information or to circumstances related thereto, such as an accident or the like.

For example, the letter, "X," can indicate a corresponding hazard light function. A letter, "P," can indicate that the motor vehicle is currently engaged in an—in particular, automated—parking process. A number can indicate, for example, that the motor vehicle is currently moving at a corresponding speed. For example, in a situation in which the motor vehicle is moving towards a tail end of a traffic jam at a reduced speed, the corresponding number can be displayed to the traffic following the motor vehicle. If the symbol is a pictogram, other road users—in particular, children—can simply and intuitively understand the corresponding information. The pictogram can depict, for example, a motor vehicle with an open vehicle door, indicating that a vehicle door of the motor vehicle is open or is about to be opened. In the context of the flashing function, it can be provided, for example, for the symbol to be an arrow—in particular, a chevron-like arrow—which points in the corresponding flashing direction. The symbol can also be an eye, if a further road user has been detected. The symbol can also depict a blue light indicated in the manner of a pictogram if a corresponding blue light or a siren has been detected.

In one possible embodiment of the motor vehicle according to the present disclosure, it is provided that the contour be at least one symbol which can be individually predefined by the or a user by means of the or a further operating device. The user can thus replace at least a portion of the—in particular, predefined—symbols with individually defined symbols by means of the operating device, and in particular via the or a touchscreen. For example, the user can replace the X-shaped contour predefined in connection with a hazard light function by an exclamation point or a pictogram which indicates a hazardous situation. This can take place, for example, by means of the touchscreen such that the matrix-like structure of the light-emitting diodes can be displayed symbolically via a user interface of the touchscreen, wherein it is possible to define, by touching the respective pixel, whether the correspondingly associated light-emitting diode or group of light-emitting diodes is switched on or off when the contour is displayed. In addition, individual symbols can be predefined by the user by drawing on the touchscreen. Further individual contours can additionally or alternatively be predefined by means of a text input which is carried out via a keyboard displayed on the touchscreen.

The contour, depicting in particular the or a symbol, can be dynamic. This means that the contour changes over time or depicts a moving animation. The dynamic contour can be realized in that individual images, similar to those in a flip book, are displayed directly one after the other. For example, a situation in which an opening or closing of a vehicle door takes place or will take place can be indicated by a pictogram which shows a vehicle with a door which executes an opening or closing movement. Furthermore, the dynamic contour can be a pulsating symbol—for example, a pulsating X in the case of an activated hazard light system.

The dynamic contour can thus also be displayed in the context of a flashing function of the lighting device. In the context of the flashing function, it is provided that the signal light go on and off in a cyclical manner. Within one cycle, an illumination period and a subsequent dark period take place. The individual images realizing the dynamic contour can be run through completely within the illumination period.

In the motor vehicle according to the present disclosure, it can be provided that the control device be designed such that a signal light function, which is realized in particular in the context of the or a flashing and/or hazard light function, and a lighting function—in particular, a daytime running light function or a taillight function—can be realized by means of the at least one lighting device. In this case, the term, "signal light function," means that the lighting device generates a signal light whose contour depends upon the at least one item of operational information. The term, "lighting function," refers either to the fact that the surroundings of the motor vehicle are illuminated or that the motor vehicle itself can be better recognized by other road users—for example, in the context of a taillight function or the like. The lighting function can be a daytime running light function, which can in particular be deactivated when the lighting device is used to generate the signal light. The lighting device is therefore used in a synergetic manner, not only for information transmission by means of the contour of the signal light, but also for the realization of the lighting function.

However, it can also be provided that the lighting device be provided exclusively for information transmission by means of the contour of the signal light, i.e., for realizing the signal light function, wherein the motor vehicle additionally comprises at least one further lighting device, by means of which a flashing function and/or a lighting function is realized. In this embodiment, a higher degree of freedom of design is present with regard to the lighting device, because no restrictions have to be taken into account in connection with further functions.

If the control device is designed such that the signal light function and the lighting function can be realized by means of the at least one lighting device, it can preferably be provided that at least one hardware component, which is part of the lighting device or is assigned to the lighting device, be able to be used both in the context of the signal light function and in the context of the lighting function. The at least one hardware component is therefore not required as a separate component in the context of the signal light function and the lighting function, but is used jointly in connection with these two functions, as a result of which, ultimately, components can be saved upon, and thus the installation space required therefor and the corresponding weight can be reduced. Therefore, the functionalities of the at least one hardware component, which can be assigned to a typically present component of the motor vehicle, such as a headlight or a taillight, are also used in the context of the generation of the signal light function, as a result of which these components ultimately assume a corresponding dual function.

The at least one hardware component can be a light-emitting diode carrier and/or an optical component—in particular, a reflector and/or a lens and/or a light pane—and/or an electronic component—in particular, a power cable and/or a semiconductor component—of the lighting device. The optical component is provided for influencing the light generated by means of the light-emitting diodes—in particular, for deflecting and/or bundling said light. The power cable can be provided in the context of a common power supply and/or the control of the light-emitting diodes—in particular, by means of the control device. The semiconductor component can be an electronic component—in particular, soldered to the light-emitting diode carrier—and used in connection with the operation or the control of the light-emitting diodes.

If the signal light function and the lighting function can be realized by means of the lighting device, it can be provided that the at least one lighting device have several signal light light-emitting diodes for realizing the signal light function and several lighting light-emitting diodes for realizing the lighting function, wherein a—with respect to the lighting light-emitting diodes—differently-colored light can be generated by means of the signal light light-emitting diodes, wherein in particular a yellow light can be generated by means of the signal light light-emitting diodes, and in particular a white or red light can be generated by means of the lighting light-emitting diodes, wherein the signal light light-emitting diodes and the lighting light-emitting diodes are arranged together on a or the light-emitting diode carrier. In this case, the control device is therefore preferably designed to control the signal light light-emitting diodes or the groups of several signal light light-emitting diodes and the lighting light-emitting diodes such that both the signal light function and the lighting function can be realized. In this context, it can be provided in particular that, if the signal light function is currently being executed, the lighting function be deactivated, and vice versa. However, the signal light function and the lighting function can also be carried out simultaneously.

Preferably, a yellow or orange light can be generated by means of the signal light light-emitting diodes because, as a result, warning signals or warning symbols are transmitted particularly effectively to other road users. White or red light can be generated by means of the lighting light-emitting diodes. The corresponding color depends in particular upon whether the lighting light-emitting diodes are associated with the daytime running light function or the taillight function.

In this embodiment, the signal light light-emitting diodes and the lighting light-emitting diodes are preferably arranged alternately next to one another or in a checkerboard-like manner. The number of respective signal light light-emitting diodes and lighting light-emitting diodes should be large enough to ensure sufficient brightness in the context of the functions.

If a signal light function and a lighting function can be realized by means of the lighting device, it can be provided that the at least one lighting device for realizing the signal light function and the lighting function have several multi-color light-emitting diodes arranged on a or the light-emitting diode carrier, wherein light with at least two different colors—in particular, white and/or red and/or yellow—can be generated by means of the multi-color light-emitting diodes. The control device is preferably designed to control the multi-color light-emitting diodes or the groups of several multi-color light-emitting diodes such that both the signal light function and the lighting function can be realized. In contrast to the previously described embodiment, in which signal light light-emitting diodes and lighting light-emitting diodes with different colors are provided, the same light-emitting diodes are used for both of these functions. As a result, the number of light-emitting diodes required can be reduced, and installation space can be conserved.

The object of the present disclosure is also achieved in that, in the case of a method of the initially-mentioned type, the light-emitting diodes and/or several groups of the light-emitting diodes are individually controlled by means of the control device such that a contour of the signal light depends upon at least one item of operational information, wherein one item of driver assistance information generated by means of a driver assistance system of the motor vehicle and describing a current operating situation and/or a current vehicle environment situation of the motor vehicle, and/or one item of user action information generated by means of at least one operating device of the motor vehicle by a user is used as at least one item of operational information. The features and advantages described in connection with the motor vehicle according to the present disclosure can be transferred to the method according to the present disclosure, and vice versa.

In the following, a preferred embodiment of the method according to the present disclosure will be described using an unlocking or locking of the motor vehicle. If a radio signal generated by the key of the motor vehicle, which initiates an unlocking or locking of the motor vehicle, is present, a multi-phase emission of signal lights by means of the lighting device is carried out.

In a first phase, the statutory regulations, which are to be observed in the context of an unlocking or locking of the motor vehicle, are fulfilled. In this case in particular, the so-called ECE regulation (Agreement Concerning the Adoption of Uniform Conditions of Approval and Reciprocal Recognition of Approval for Motor Vehicle Equipment and Parts) is essential. During the first phase, it is thus provided that in particular all of the light-emitting diodes of the lighting device be controlled by means of the control device such that the—in particular, yellow—signal light briefly flashes twice. As a result, the stipulations specified by ECE regulation are fulfilled.

In a second phase, which can immediately follow the first phase or start after a short pause after the first phase, the information is transmitted to other road users by means of the contour of the signal light. According to the ECE regulations, it is thus permissible to carry out a so-called "lamp function check" in the context of the unlocking or locking of the motor vehicle, during which the individual light sources can be switched on and off in any way. During the second phase, either as part of a flashing function or a permanently lit signal light, an—in particular, dynamic—contour which implies the unlocking or locking of the motor vehicle is displayed. In particular, the contour can be a symbol showing a pictogram, by means of which a vehicle with open or closed doors is shown. The second phase can take 0.3 s. The second phase can have a duration of up to 3 s, which, according to the ECE regulation, is the maximum permissible duration for the lamp function check.

If necessary, a third phase can follow the second phase—in particular, immediately or after a pause—in which the information that the door or the doors of the motor vehicle are currently open or closed is transmitted by means of the contour of the signal light.

This can also take place in particular on the basis of whether an actual opening or closing of the doors has actually taken place, which can be determined, for example, on the basis of corresponding sensory information. Alternatively, the daytime running light or the taillight function of the lighting device can be activated in the third phase, which, by way of example, lasts 2.7 seconds.

FIG. 1 shows a first exemplary embodiment of a motor vehicle 1 according to the present disclosure, comprising a control device 2 and, by way of example, six lighting devices 3. The control device 2 is connected to the lighting devices 3 and further components, as will be explained below, by means of suitable electrical connections for signal transmission, which are not shown for reasons of clarity. Specifically, the lighting devices 3 are two headlights 4*a*, 4*b*, two so-called side markers or side lights 5*a*, 5*b*, and two taillights 6*a*, 6*b*. In FIG. 1, the spatial directions with respect to the motor vehicle 1 are defined on the basis of the depicted coordinate axes, wherein the x-direction points towards the rear along the longitudinal direction of the motor vehicle 1, the y-direction points to the right along the transverse direction of the motor vehicle 1, and the z-direction points upwards along the vertical direction of the motor vehicle 1.

In particular, the control device 2 is in this case designed to realize a flashing function and/or a hazard light function in which the signal light is periodically switched on and off.

Figure 2:
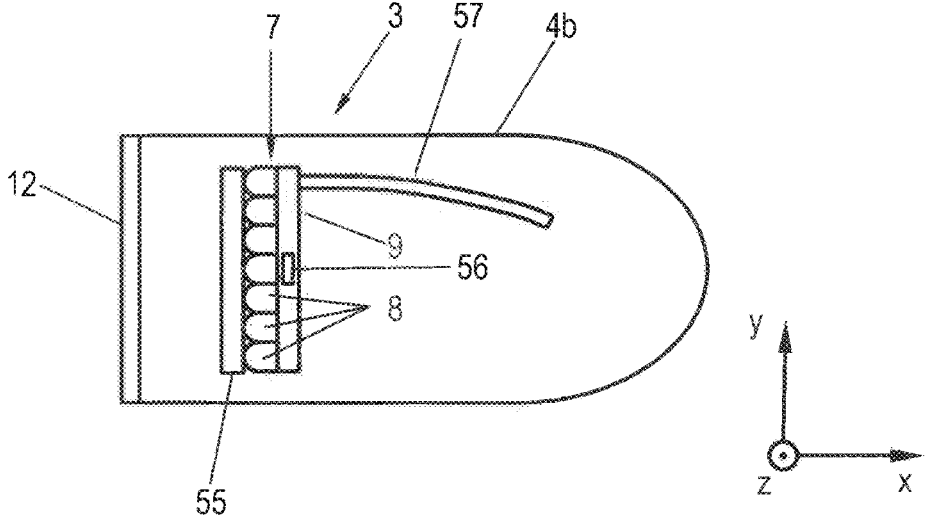
FIG. 2 shows a side view of the lighting device of the motor vehicle from FIG. 1.
Figure 3:
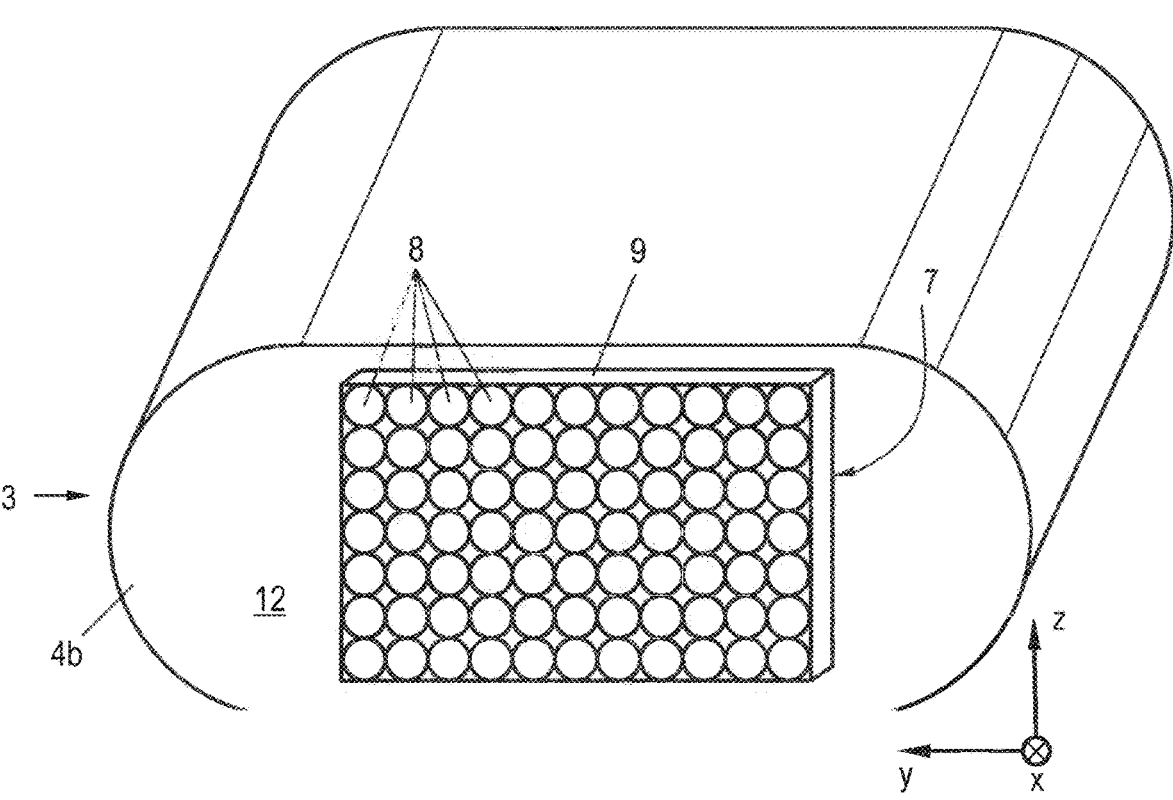
FIG. 3 shows a front view of the lighting device of the motor vehicle from FIG. 1.
Figure 4:
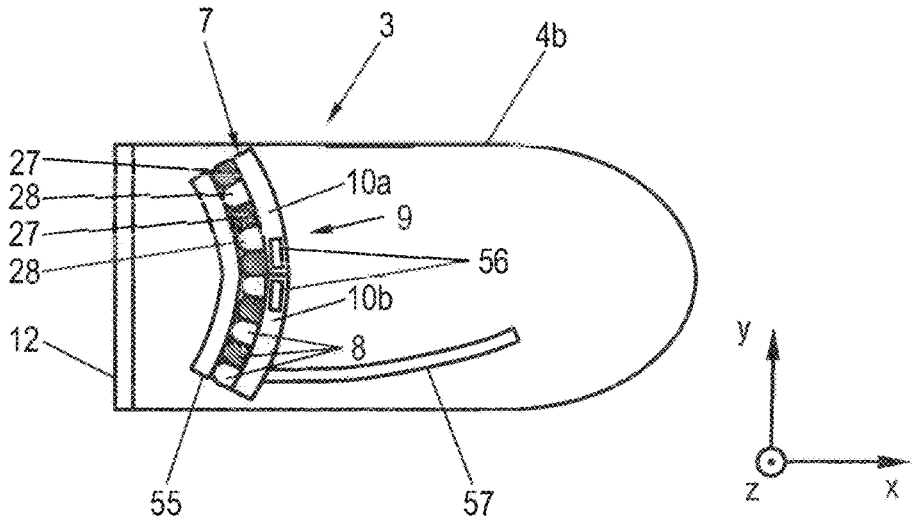
FIG. 4 shows the lighting device of a second exemplary embodiment of the motor vehicle according to the present disclosure.

Details relating to the lighting device 3 are shown in FIGS. 2 and 3. FIG. 2 shows a longitudinal section, and FIG. 3 shows a front view of the left headlight 4*b*. The aspects explained with reference to FIGS. 2 and 3 are equally applicable to all other lighting devices 3 of the motor vehicle 1. FIG. 4 shows a lighting device 3, which corresponds to FIG. 2, of a second exemplary embodiment of a motor vehicle 1. Apart from the differences described, all aspects of the first exemplary embodiment apply equally to the second exemplary embodiment.

With regard to the first exemplary embodiment, the lighting device 3 comprises several light-emitting diodes 8 arranged to be distributed within a planar surface 7, wherein a signal light can be generated by means of the lighting device 3 or the light-emitting diodes 8, said signal light being visible to the outside through a transparent pane 12, which delimits the interior of the lighting device 3, of the lighting device 3 on the front side. By way of example, the light-emitting diodes 8 are in this case arranged in a row-like and column-like manner, i.e., in a matrix-like manner. Even though the light-emitting diodes 8 in the present case form only a 7×11 matrix, it is merely to be understood schematically, wherein the light-emitting diodes 8 can form a matrix with far more rows and columns. In the exemplary embodiments shown, the light-emitting diodes 8 are designed to be round, but they can equally also be rectangular, square, or shaped in other ways.

The light-emitting diodes 8 are arranged on, and soldered to, a light-emitting diode carrier 9 designed as a single-piece circuit board, wherein the surface of the light-emitting diode carrier 9 defines the surface 7 within which the light-emitting diodes 8 are arranged. With regard to the light-emitting diode carrier 9, there is a difference from the second exemplary embodiment of FIG. 4. In the second exemplary embodiment, it thus comprises several light-emitting diode carrier portions 10*a*, 10*b* which are provided as circuit boards arranged laterally next to one another. In addition, the surface 7 in the second exemplary embodiment is not designed to be flat, but is designed to be curved, and in particular to be parabolic.

By means of the control device 2, the light-emitting diodes 8 can be individually controlled such that a contour 11 of the signal light, which will be described later in detail, depends upon several items of operational information. The operational information sometimes relates to driver assistance information which describes a current operating situation and a current vehicle environment situation of the motor vehicle 1. The driver assistance information is generated by means of a driver assistance system 13, which is provided for an at least partially autonomous driving operation of the motor vehicle 1. By way of example, the driver assistance system 13 is executed by the control device 2.

The vehicle environment situation is detected by means of several sensors 14 of the motor vehicle 1, said sensors being originally assigned to the operation of the driver assistance system 13. In this context, a camera designed as an optical sensor 15, a radar sensor 16, and an accident detection sensor 17, designed as an acceleration sensor, of the motor vehicle 1 are provided. The sensors 14 are connected to the control device 2 for the corresponding signal transmission. By means of the optical sensor 15 and/or the radar sensor 16, objects in the surroundings of the motor vehicle 1—in particular, further road users, such as pedestrians, cyclists, or other motor vehicles—can thus be detected, wherein the corresponding operational information indicates that a pedestrian or cyclist or the like has been detected. In order to detect any collision of the motor vehicle, the accident detection sensor 17 is provided, wherein the corresponding operational information relates to the presence of an accident. An acoustic sensor 54 of the motor vehicle 1 is provided as a further sensor 14, by means of which sounds from the surroundings of the motor vehicle 1 can be detected. As a result, accident situations can also be detected, for example, on the basis of a siren or the like.

The operational information also relates to user action information which can be generated by a user 20, and in particular a driver of the motor vehicle 1. The user action information thus relates to control actions that can be performed on operating devices 19 of the motor vehicle 1. The operating devices 19 are connected to the control device 2 for the corresponding signal transmission.

One of the operating devices 19 is a lever 21, by means of which a flashing function of the lighting device 3 can be initiated. One of the operating devices 19 is a button 22, by means of which the lighting device 3 can be activated as a hazard light system. One of the operating devices 19 is the touchscreen 18, by means of which the user 20 can, for example, alternatively to the button 22, activate the hazard light system or the like. The respective present operational information is also output by the touchscreen 18. One of the operating devices 19 is a speech recognition device 23, by means of which voice commands can be detected.

Finally, one of the operating devices 19 is a key 24 for unlocking and locking the motor vehicle 1. For this purpose, the user 20 can press a button of the key 24, as a result of which a radio signal 26 detectable by a radio sensor 25 of the motor vehicle 1 is emitted. An electrical signal subsequently generated by the radio sensor 25 causes doors or hatches of the motor vehicle 1 to be locked or unlocked, wherein this signal is also transmitted to the control device 2. The operating device 19 designed as a key 24 is therefore not directly, but instead via the radio signal 26 and the radio sensor 25, connected to the control device 2.

In the following, the aspect is explained in which the control device 2, in addition to a signal light function with which the contour 11 of the signal light can be generated on the basis of the operational information, is designed to realize a lighting function, viz., a daytime running light function, by means of the headlights 4*a*, 4*b*. In this case, the signal light function is in particular the flashing and/or hazard light function. The light-emitting diodes 8 in the headlight 4*b* shown in FIGS. 2 and 3 are designed as multi-color light-emitting diodes, which can generate light with a white and yellow or an orange color. If the light-emitting diodes 8 emit white light, the lighting function of the headlight 4*b* or the lighting device 3 is realized. In contrast, the signal light function is realized in that the light-emitting diodes 8 emit the yellow light.

With regard to this aspect, it is also provided in the headlight 3 shown as a schematic representation in FIG. 4 that it be able to realize both the signal light function and the lighting function. In contrast to the lighting device 3 shown in FIGS. 2 and 3, it is provided in the lighting device 3 of FIG. 4 that the light-emitting diodes 8 be signal light light-emitting diodes 27 and lighting light-emitting diodes 28. In FIG. 4, the signal light light-emitting diodes 27 shown as hatched and the lighting light-emitting diodes 28 are arranged, for example, alternately, viz., in the form of a checkerboard pattern. In this case, only a yellow or orange light can be generated by means of the signal light light-emitting diodes 27, and only a white light can be generated by means of the lighting light-emitting diodes 28, wherein the signal light function or the lighting function is performed by a corresponding individual actuation of the light-emitting diodes 8 by the control device 2. Therefore, in the context of the signal light function, only the signal light light-emitting diodes 27 emit light, and, in the context of the lighting function, only the lighting light-emitting diodes 28 emit light.

In contrast, for the side lights 5a, 5b, it is provided that the light-emitting diodes 8 be able to emit only yellow or orange light.

The lighting devices 3 designed as taillights 6a, 6b can emit differently-colored light, analogous to the lighting devices 3 designed as headlights 4a, 4b. Specifically, the taillights 6a, 6b can emit red light, which is generated as a rear light in the context of their function, as well as yellow or orange light, which is generated in the context of the signal light function. In order to realize the differently-colored light of the taillights 6a, 6b, light-emitting diodes 8 by means of which light with different colors can be generated, as has been described with reference to FIG. 2, or, as has been described with reference to FIG. 4, light-emitting diodes 8 provided as signal light light-emitting diodes 27 and lighting light-emitting diodes 28, can be provided, wherein the lighting light-emitting diodes 28 in this case generate red light.

In both exemplary embodiments shown in FIGS. 2 and 4, it is provided that several hardware components, which in each case are a part of the lighting device 3, be able to be used both in the context of the signal light function and in the context of the lighting function. Specifically, the hardware components of the light-emitting diode carriers 9 are an optical component 55, e.g., a reflector or a lens or a light pane, and several electronic components, viz., a semiconductor component 56 and a power cable 57. The optical component 55 is provided for influencing the light generated by means of the light-emitting diodes 8—in particular, for deflecting and/or bundling said light. The power cable 57 is linked to a common power supply and to the control of the light-emitting diodes 8 by means of the control device 3. The semiconductor component 56 is an electronic component soldered to the light-emitting diode carrier 9 and used in connection with the operation of the light-emitting diodes 8.

Figure 5:
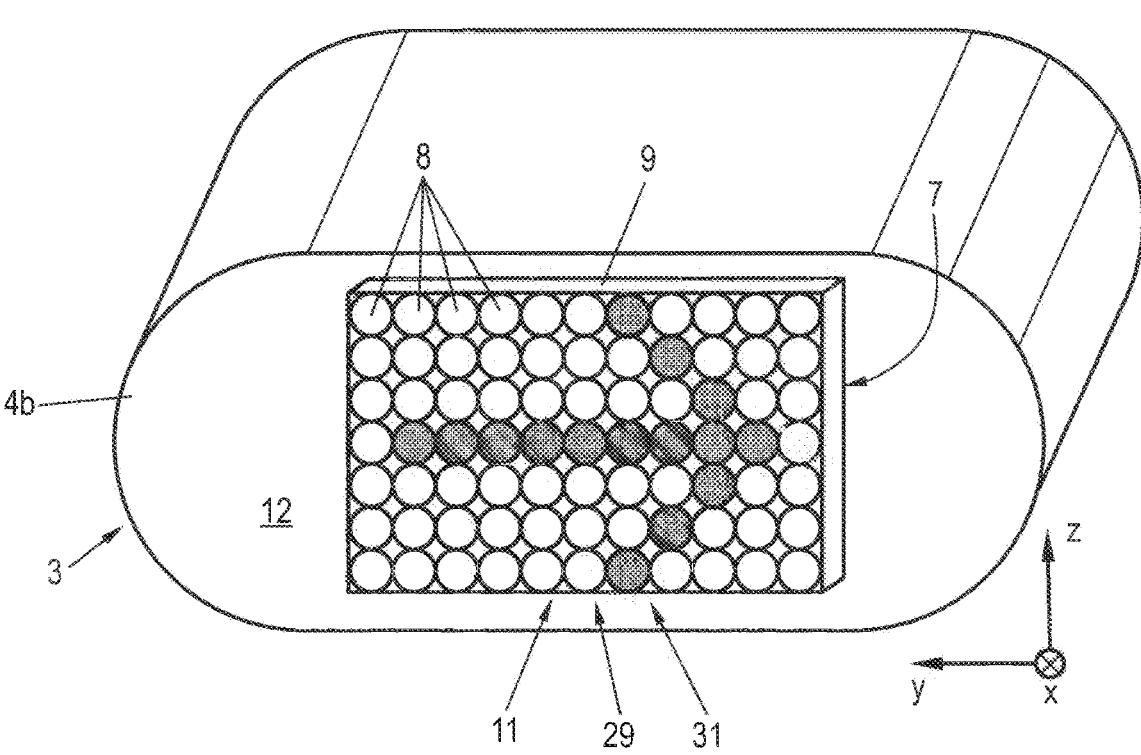
FIGS. 5-8 show the lighting device of FIG. 3 with several possible contours of the signal light.
Figure 6:
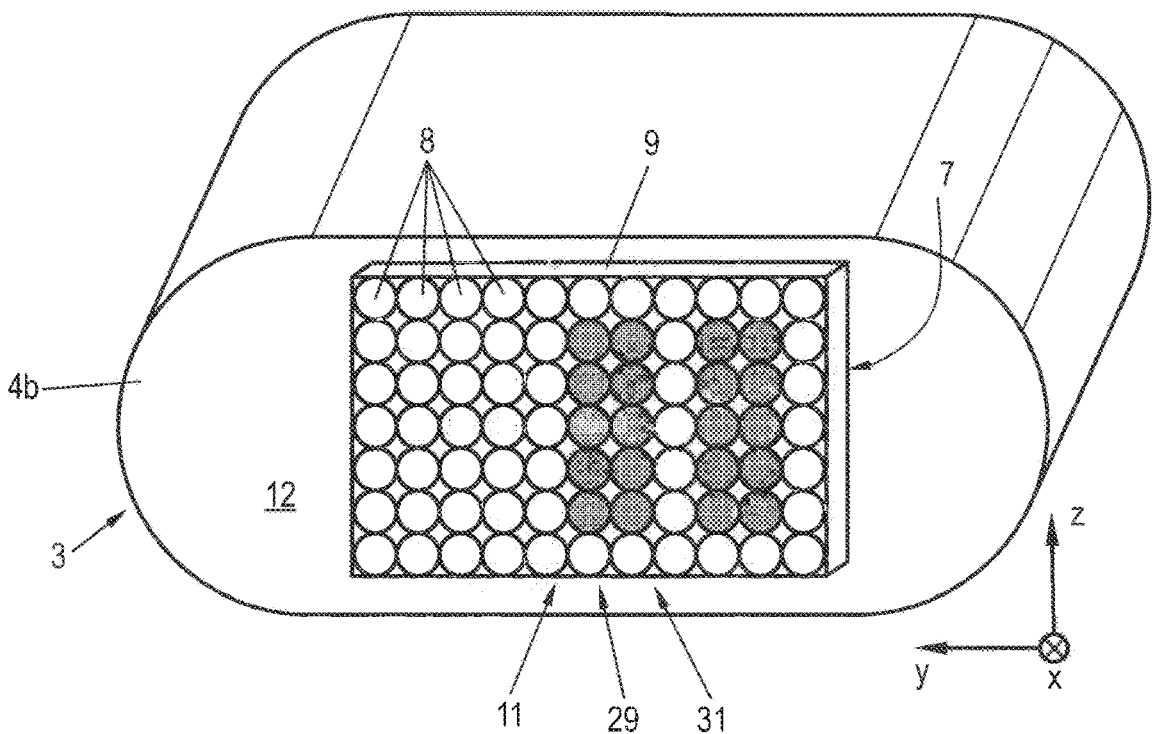
Figure 7:
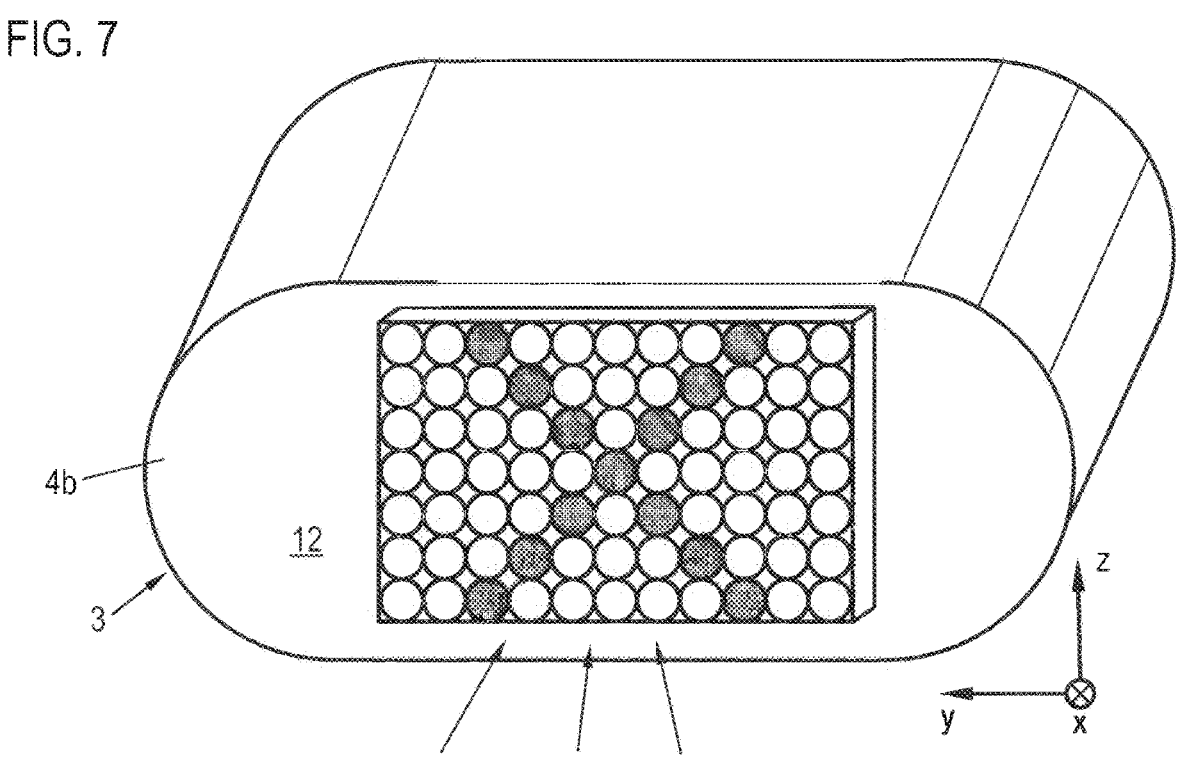
Figure 8:
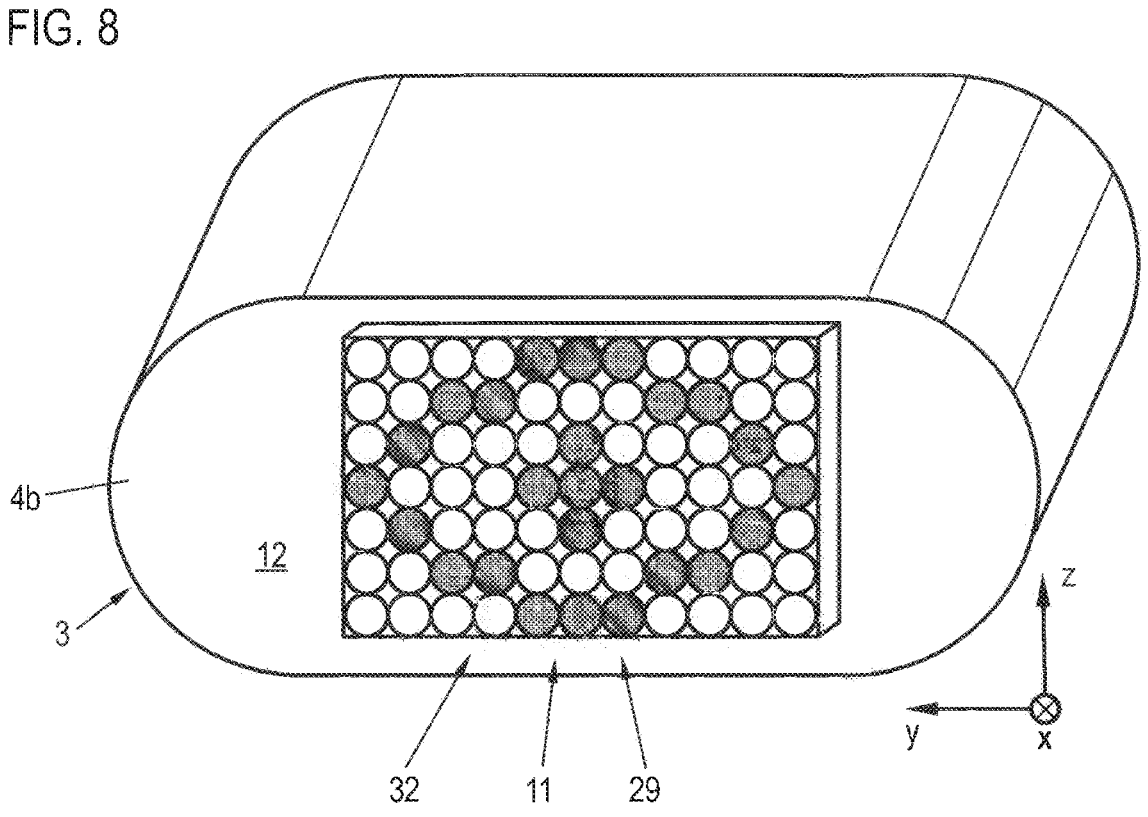

In the following, details relating to the contour 11 of the signal light will be described with reference to FIGS. 5 through 8. It is provided in the motor vehicle 1 that the contour 11 be a predefined symbol 29 which can be retrieved from a data memory 30 of the control device 2. The symbol 29 shown in FIG. 5 is a pictogram 31 in the form of an arrow. Instead of the arrow, a chevron or the like can also be provided. The contour 11 shown in FIG. 5 is displayed when a turn signal of the motor vehicle 1 has been actuated by means of the lever 21. In this case, the signal light function is carried out in the context of a flashing function. The contour 11 shown in FIG. 6 is a pictogram 31 consisting of two vertical bars which are displayed when the motor vehicle 1 is being unlocked or locked. The contour 11 shown in FIG. 7 is a symbol 29, viz., a letter 32. This contour 11—in the present case, an "X"—is displayed when—in particular, by means of the button 22—a hazard light function of the motor vehicle 1 has been activated. Alternatively, the contour 11 shown in FIG. 7 is displayed when an accident of the motor vehicle 1 has been sensed by means of the accident detection sensor 17. A further example of a corresponding pictogram 31 is shown in FIG. 8. In this example, the contour 11 represents an eye, which communicates that the driver assistance system 13 has detected a further road user such as a pedestrian or a cyclist. Further predefined symbols 29 such as numbers or further pictograms 31—in particular, lines, hooks, diamonds, and the like—are possible. For example, a symbol 29 showing the letter "P" can indicate that an automatic parking process is currently taking place.

In addition to the predefined symbols 29, it is provided that the contour 11 be able to be individually predefined by the user 20. This individual specification is carried out in the present case via the touchscreen 18. For example, individual symbols 29 can be predefined by the user 20 drawing on the touchscreen 18. In this case, it is conceivable that, instead of the "X" depicted in FIG. 7, a hazard light be indicated by means of an exclamation point. This exclamation point or further individual contours 11 can be predefined, for example, by means of a drawing function or by means of a text input, which is carried out via a keyboard displayed on the touchscreen 18.

With regard to the contour 11 of the signal light depicting the symbol 29, it is provided for the contour 11 to not only be a static symbol 29, but also a dynamic symbol 29. Details hereto will be described later by way of example with reference to FIG. 12.

In the following, further aspects and advantages of the present disclosure will be described with reference to the traffic situations shown in FIGS. 9 through 11, in which at least one motor vehicle 1 according to the present disclosure is involved. All of these motor vehicles 1 according to the present disclosure correspond in each case to the motor vehicle 1 described in connection with FIG. 1.

Figure 9:
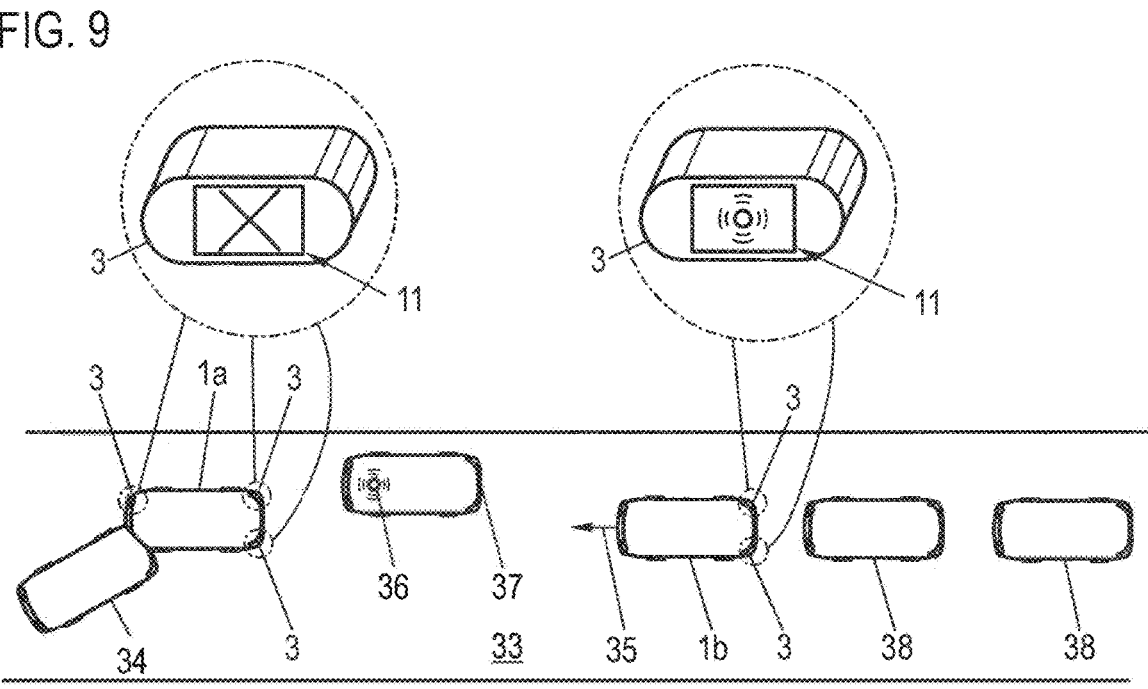
FIG. 9 shows a first traffic situation with two motor vehicles according to the present disclosure.

The traffic situation depicted in FIG. 9 shows an accident on a road 33, in which a motor vehicle 1a according to the present disclosure has collided with a further car 34 involved in the accident. The collision was detected by means of the accident detection sensor 17 of the motor vehicle 1a, wherein the remaining intact lighting devices 3 of the motor vehicle 1a output flashing light signals with an X contour according to FIG. 7.

In addition, in this situation, a further motor vehicle 1b according to the present disclosure is involved, which has come to a standstill before the accident and whose intended direction of travel is indicated by the arrow 35. By means of the optical sensor 15 of the motor vehicle 1, a blue light 36 of an emergency vehicle 37 already present at the accident site is detected. In response thereto, the contour 11 of the motor vehicle 1b depicts the blue light 36. In addition, the contour 11 depicted by the motor vehicle 1a, viz., an X indicating the accident, is detected by means of the optical sensor 15, as a result of which the corresponding X, in addition to the blue light pictogram, is also displayed by means of the motor vehicle 1b. The signal light of the motor vehicle 1b thus flashes such that the blue light and the X are displayed alternately—in particular, for motor vehicles 38 following behind.

Figure 10:
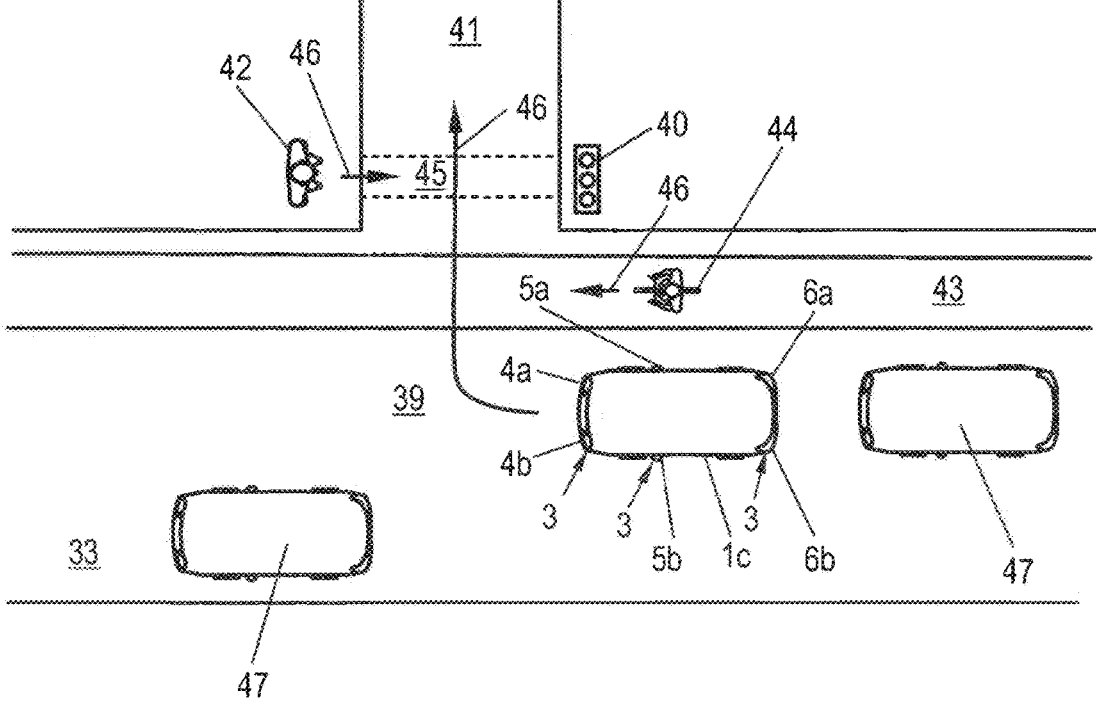
FIG. 10 shows a second traffic situation with one motor vehicle according to the present disclosure.

In the traffic situation shown in FIG. 10, a motor vehicle 1c according to the present disclosure is standing at an intersection 39 before a red traffic light 40. The driver of the motor vehicle 1c intends to turn right from the road 33 into a branching road 41. Furthermore, a pedestrian 42 is located at the intersection and intends to cross a pedestrian crossing 45 of the branching road 41. A cyclist 44 also stands in front of the red traffic light 40 on a bike path 43 and on the right next to the motor vehicle 1c, and intends to continue straight ahead. The respective driving or walking directions are indicated by the arrows 46.

In the motor vehicle 1c, the lever 21 has been actuated to activate a right turn signal. Furthermore, the driver assistance system 13 has detected both the pedestrian 42 and the cyclist 44 by means of the optical sensor 15. The flashing signal lights of the motor vehicle 1c thus each have a contour 11, so that the pedestrian 42, the cyclist 44, and the drivers of further vehicles 47 are adequately informed. Specifically, the contour 11 of the flashing signal light depicted by means of the right headlight 4a and the right side light 5a shows an eye according to FIG. 8, so that the pedestrian 42 and the cyclist 44 can recognize from their respective point of view that they can continue on their path without danger after the traffic light 40 changes. The right taillight 6a of the motor vehicle 1c shows a flashing signal light with a contour 11 of an arrow pointing to the right (see FIG. 5), so that the driver of the following motor vehicle 47 is informed about the intended turn. Drivers of any oncoming motor vehicles detect the flashing of the right headlight 4a and thus recognize the intended turn.

Figure 11:
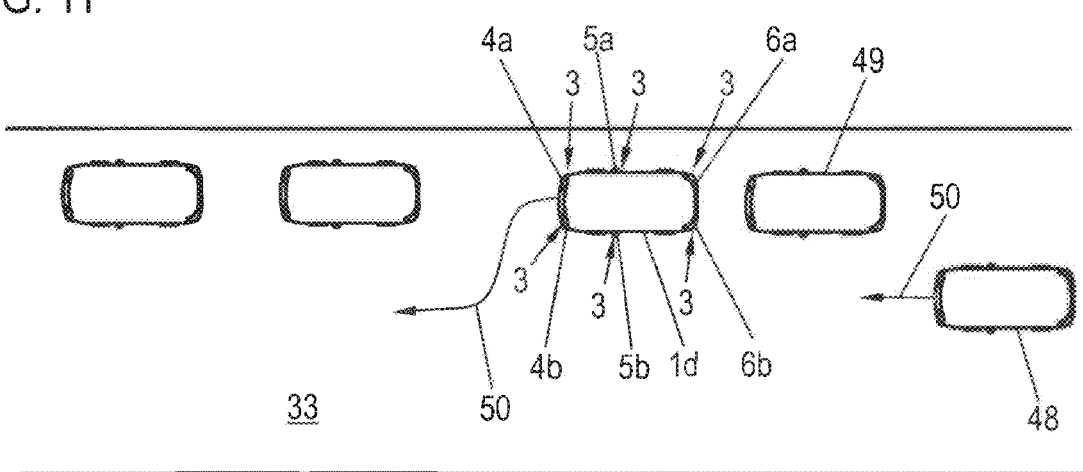
FIG. 11 shows a third traffic situation with one motor vehicle according to the present disclosure.

A further traffic situation is finally shown in FIG. 11, in which a motor vehicle 1d intends to merge from a parking space into a road 33. In this case, from the perspective of a vehicle 48 coming from behind, the right taillight 6a is concealed by a parked vehicle 49. Intended driving directions of the motor vehicles 1d, 48 are indicated by arrows 50. Since the lever 21 for displaying said merging has been actuated in the motor vehicle 1d, the lighting devices 3 show signal lights with corresponding arrow contours according to FIG. 5. This unmistakably indicates to the driver of a vehicle 48 coming from behind that the motor vehicle 1d is about to leave the parking space. In this case, it is in particular made possible by the contour 11 to make the distinction that the motor vehicle 1d has not switched on hazard lights or has been unlocked/locked, but has instead activated the turn signal.

Figure 12:
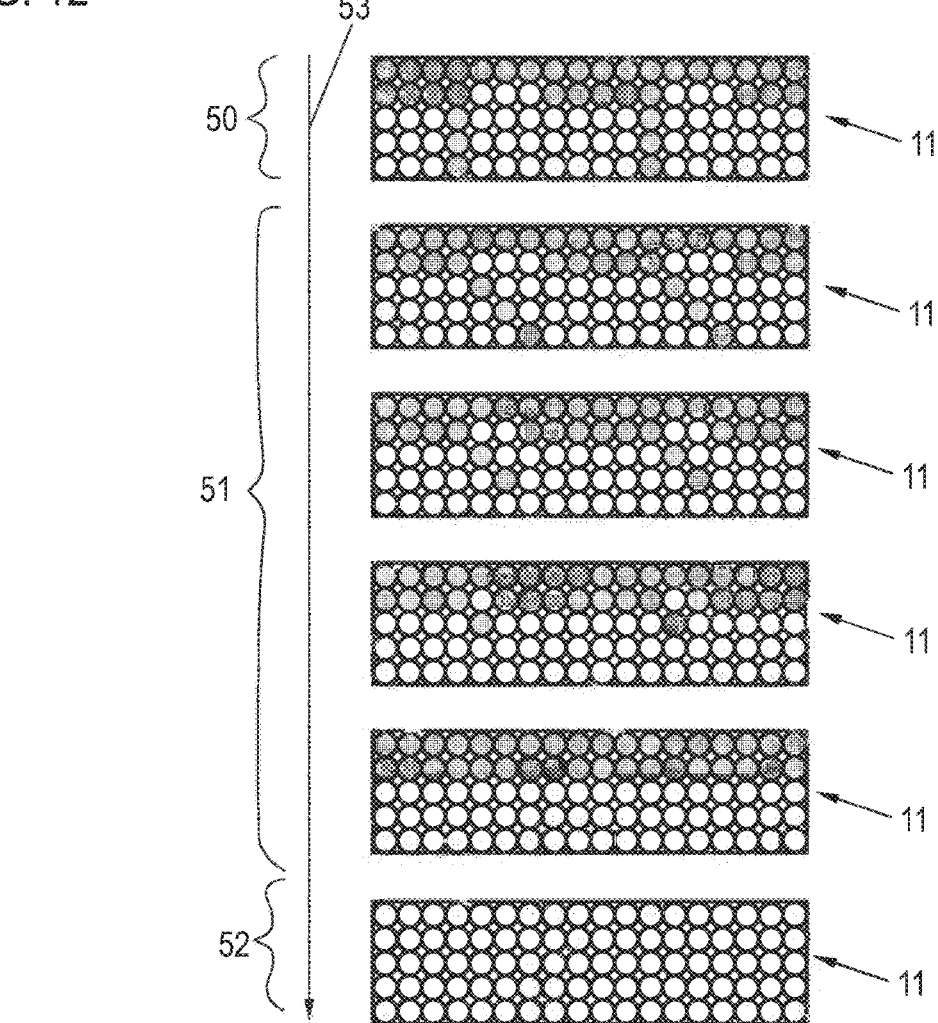
FIG. 12 shows a flowchart-type representation of a method according to the present disclosure.

FIG. 12 shows an exemplary embodiment of a method according to the present disclosure which is carried out in the context of locking the motor vehicle 1. In particular on the basis of the traffic situation shown in FIG. 11, it becomes clear that the execution of this method is expedient. The method shown corresponds in particular to the requirements of the ECE regulation. If the operational information indicates that the motor vehicle 1 is locked by means of the key 24, three phases 50, 51, 52 are run through in the depicted method, wherein the sequence is indicated by the time arrow 53.

In the first phase 50, a double flashing of the signal light generated by means of the lighting device 3 takes place, wherein each flashing cycle lasts for one second. The contour 11 of the signal light is the pictogram 31 indicating a vehicle with open vehicle doors.

In the second phase 51, the contour 11 or the pictogram 31 is dynamic, wherein an animation indicates a closing of the vehicle doors. For this purpose, four, directly successive pictograms 31 are shown by way of example by means of the lighting device 3, in which the vehicle doors always continue to close further. As a result, similar to a flip book, an apparent closing movement of the vehicle doors is shown. The complete run-through of these four images takes approximately 0.3 seconds, wherein the second phase can be completed after a single run-through of these images. Likewise, the second phase 51 can comprise multiple run-throughs of the four pictograms 31, so that the second phase 51 lasts for a maximum of three seconds, for example.

In the third phase, which is optional with regard to the ECE regulation and, by way of example, takes 2.7 seconds, the daytime running light or the taillight function of the lighting device 3 is activated.

The invention claimed is:

1. A motor vehicle comprising:
   one or more lighting devices configured as at least one of a headlight, a side light or a taillight, wherein a lighting device of the one or more lighting devices comprising several light-emitting diodes arranged to be distributed within a surface, the several light-emitting diodes further comprising:
      a first plurality of signal light light-emitting diodes configured to implement a signal light function, and
      a second plurality of lighting light-emitting diodes configured to implement a lighting function, wherein the first plurality of signal light light-emitting diodes are configured to generate differently-colored light with respect to the second plurality of lighting light-emitting diodes to generate a signal light and wherein the first plurality of signal light light-emitting diodes are further configured to generate same-colored light with respect to the second plurality of lighting light-emitting diodes to generate the lighting function; and
   a control device configured to:
      individually control the several light-emitting diodes to generate a contour of the signal light on the one or more lighting devices, dependent upon at least one item of operational information,
      detect at least one item of operational information, wherein the at least one item of operational information comprises:
         an item of driver assistance information that describes a current operating situation and a current vehicle environment situation of the motor vehicle, or
         an item of a user action information generated by a user using at least one operating device of the motor vehicle;
      simultaneously implement, using the first plurality of signal light light-emitting diodes, the signal light function with a contour of the signal light generated on the basis of the at least one item of operational information and the lighting function using the second plurality of lighting light-emitting diodes to illuminate surroundings of the motor vehicle; and
      implement the lighting function using the first plurality of signal light light-emitting diodes and the second plurality of lighting light-emitting diodes when all of the several light-emitting diodes are available to fulfil the lighting function.

2. The motor vehicle of claim 1, wherein the control device configured to control the several light-emitting diodes to implement a flashing function or a hazard light function.

3. The motor vehicle of claim 1, wherein the at least one item of operational information is the at least one item of driver assistance information, wherein at least one sensor of the motor vehicle detects the at least one item of driver assistance information, and wherein the at least one sensor is an optical sensor, an acoustic sensor, a radar sensor or an accident detection sensor.

4. The motor vehicle of claim 3, wherein the optical sensor is a camera and/or wherein the accident detection sensor is an acceleration sensor.

5. The motor vehicle of claim 2, wherein the at least one item of operational information is the at least one item of user action information, and wherein the at least one operating device is a lever, a button, a touchscreen, a voice recognition device, or a radio-based key for unlocking and locking the motor vehicle.

6. The motor vehicle of claim 5, wherein the lever is configured to initiate the flashing function of the lighting device.

7. The motor vehicle of claim 5, wherein the button is configured to initiate the hazard light function of the lighting device.

8. The motor vehicle of claim 1, wherein the lighting device is arranged on a front portion, a rear portion, a lateral portion, or a combination thereof, of the motor vehicle.

9. The motor vehicle of claim 8, wherein the lighting device comprises several light emitting diodes arranged in rows and columns.

10. The motor vehicle of claim 1, wherein the one or more lighting devices, visible from different viewing angles to the motor vehicle, are arranged at different positions of the motor vehicle, and wherein the control device is further configured to control at least two of the lighting devices to produce different contours of at least two of the one or more lighting devices.

11. The motor vehicle of claim 1, wherein the control device is further configured to produce a contour comprising at least one of:
 a predefined symbol retrieved from a data memory of the motor vehicle; or
 a symbol individually predefined by a user using another operating device.

12. The motor vehicle of claim 11, wherein the predefined symbol forming the contour is at least one of a letter, a number, or a pictogram.

13. The motor vehicle of claim 1, wherein the control device is further configured to provide a lighting function as a daytime running function or implement a tailgate function using the one or more lighting devices.

14. The motor vehicle of claim 1, wherein a hardware component configured to be a part of the one or more lighting devices, or configured to be assigned to the lighting device, is used both in the context of the signal light function and in the context of the lighting function, wherein the hardware component is a light-emitting diode carrier or an optical component or an electronic component being a power cable of the lighting device.

15. The motor vehicle of claim 14, wherein the optical component is at least one of a reflector, a lens, or a light pane and the electronic component is a power cable or a semiconductor component.

16. The motor vehicle of claim 14, wherein the electronic component is a power cable or a semiconductor component soldered to the light-emitting diode carrier and used in connection with an operation of the several light-emitting diodes.

17. The motor vehicle of claim 1, wherein a signal light light-emitting diode generates a yellow light and a lighting light-emitting diode generates a white or red light.

18. The motor vehicle of claim 1, wherein the differently colored light-emitting diodes generate light with at least two different colors, and wherein the at least two different colors are any two colors of, white, red, and yellow.

19. A method for operating a motor vehicle comprising one or more lighting devices configured as at least one of a headlight, a side light or a taillight, the method comprising:
 implementing a signal light function using a first plurality of signal light light-emitting diodes of a lighting device of the one or more lighting devices;
 implementing a lighting function, using a second plurality of lighting light-emitting diodes of a lighting device of the one or more lighting devices,
 wherein the first plurality of signal light light-emitting diodes are configured to generate differently-colored light with respect to the second plurality of lighting light-emitting diodes to generate a signal light and wherein the first plurality of signal light light-emitting diodes are further configured to generate same-colored light with respect to the second plurality of lighting light-emitting diodes to generate the lighting function;
 generating a contour on the one or more lighting devices of the signal light by individually controlling the signal light-emitting diodes based on at least one item of operational information,
  wherein the at least one item of operational information comprises:
  an item of a driver assistance information that describes a current operating situation and a current vehicle environment situation of the motor vehicle, or
  an item of a user action information generated by a user using at least one operating device of the motor vehicle; and
 implementing, using the first plurality of signal light light-emitting diodes, a signal light function with a contour of the signal light generated on the basis of the at least one item of operational information and implementing, using the second plurality of lighting light-emitting diodes, a lighting function to illuminate surroundings of the motor vehicle.

20. The motor vehicle of claim 1, wherein the signal light light-emitting diodes and the lighting light-emitting diodes are arranged next to one another on a light-emitting diode carrier.

21. The motor vehicle of claim 1, wherein the signal light light-emitting diodes and the lighting light-emitting diodes are configured to implement the signal light function and the lighting function.

22. The motor vehicle of claim 1, wherein the control device comprises a driver assistance system and a data memory.

* * * * *